Aug. 13, 1957     R. F. HEINRICH     2,802,545

CYCLONE DUST SEPARATORS

Filed Jan. 30, 1953

United States Patent Office 2,802,545
Patented Aug. 13, 1957

2,802,545

CYCLONE DUST SEPARATORS

Richard Fritz Heinrich, Cheadle, England

Application January 30, 1953, Serial No. 334,195

1 Claim. (Cl. 183—76)

The present invention relates to cyclone dust separators of either the reverse flow type or the type in which the gas enters at one end and leaves at the other.

If the operation conditions in these dust separators are not very favourable the dust becomes sticky and tends to clog the dust outlet. In quite a number of cases, for instance, the dust cones of reverse flow type cyclones have become obstructed and similar clogging has been observed with other types of dust outlets.

The present invention overcomes this difficulty by providing a helix of preferably less than one turn, of strip material, which is mounted at the dust outlet coaxially with the cyclone tube, one end of the strip being attached to the cyclone tube while the other end is free to vibrate.

In order to keep the amplitude of the vibration, which is caused by the gas stream itself, within limits, a stop is provided against which the free end of the strip strikes when it reaches the maximum desired deflection. The stop may be adjustable, and it may be attached to the cyclone tube so that the strip when striking against the stop has the effect of rapping the tube. The vibration of the strip prevents the dust from settling on it.

Referring to the accompanying drawing.

Figure 1:
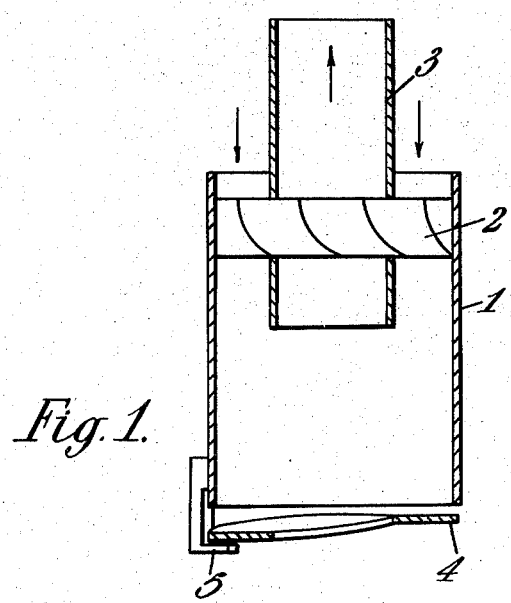
Figure 1 shows diagrammatically and in section a reverse flow type of cyclone, in accordance with the invention.
Figure 2:
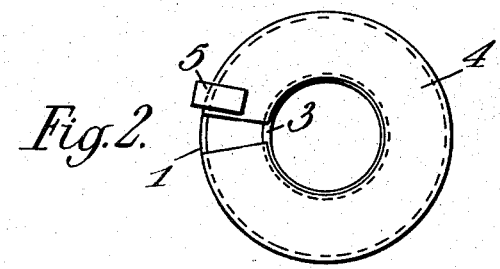
Figure 2 is an inverted plan view.

Referring to Figures 1 and 2, the gas enters at the upper end of the cyclone tube 1, is caused to flow in a helical path by the blades 2, and leaves through the central tube 3. At the lower end of the cyclone tube 1, where the dust is discharged, there is a helical strip 4, making somewhat less than a complete turn of the helix. The upper end of the strip 4 is secured to the lower end of the cyclone tube 1, and a stop 5 secured to the tube 1 limits the movement of the free, lower end of the strip 4. Dust is discharged through the gap between the two ends of the strip 4. The vibration of the strip 4, caused by the gas flow, shakes the dust off the strip and its free end, striking against the stop 5, imparts vibration to the tube 1 and prevents dust settling thereon.

Figure 3:
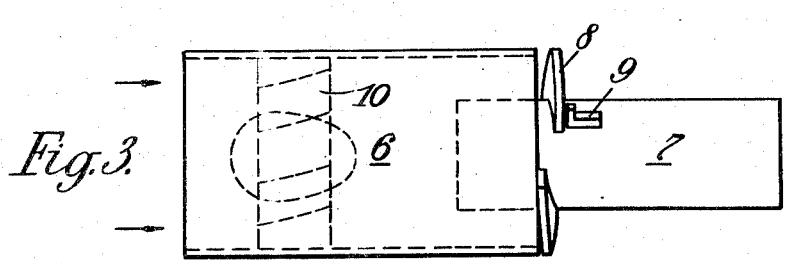
Figure 3 shows in side elevation a straight flow cyclone according to the invention.

In Figure 3, the gas enters the cyclone tube 6 at its left hand end, where a whirling motion is imparted to it by vanes 10 and leaves by the central tube 7. A helical strip 8 is secured at one end to the end of the tube 6 and surrounds the tube 7. Its free end strikes against a stop 9 attached to the tube 7. Dust leaves through the gap between the ends of the strip 8.

What I claim is:

A cyclone dust separator, having a cyclone tube with a dust outlet at one end thereof, a helix of thin strip material mounted coaxially with and outside the cyclone tube at the dust outlet, one end of the strip being attached to the cyclone tube and the remainder of the strip being out of contact with the tube and free to vibrate, and a fixed stop adapted to be struck by the free end of the helix when vibrating, to transmit vibration to the cyclone tube.

References Cited in the file of this patent

UNITED STATES PATENTS

| 1,757,834 | Haegler | May 6, 1930 |
| 2,506,298 | Griffen | May 2, 1950 |
| 2,582,423 | Foley | Jan. 15, 1952 |

FOREIGN PATENTS

| 1,353 | Switzerland | Aug. 28, 1889 |